(12) United States Patent
Marshall et al.

(10) Patent No.: US 6,590,365 B2
(45) Date of Patent: Jul. 8, 2003

(54) METHOD OF POWERING-UP BATTERY POWERED APPARATUS

(75) Inventors: Christopher B. Marshall, Haywards Heath (GB); Paul R Marshall, Salfords (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/015,722

(22) Filed: Nov. 30, 2001

(65) Prior Publication Data
US 2002/0067152 A1 Jun. 6, 2002

(30) Foreign Application Priority Data
Dec. 6, 2000 (GB) .............................................. 0029644

(51) Int. Cl.[7] .................................................. H02J 7/00
(52) U.S. Cl. ..................................................... 320/135
(58) Field of Search ................................ 320/135, 132; 363/49, 78; 323/901, 267; 307/38, 140; 73/861.357, 861.355; 324/713, 76.11, 126, 704, 76.39

(56) References Cited

U.S. PATENT DOCUMENTS

| 5,481,452 A | * | 1/1996 | Simmons ..................... 700/12 |
| 5,729,062 A | | 3/1998 | Satoh ......................... 307/130 |
| 5,790,392 A | | 8/1998 | Eklund et al. ................ 363/49 |

* cited by examiner

Primary Examiner—Edward H. Tso
Assistant Examiner—Pia Tibbits
(74) Attorney, Agent, or Firm—Jack D. Slobod

(57) ABSTRACT

A method of powering-up a battery powered equipment by a phased activation of a function, for example the gain of a power amplifier (44), to increase the current consumption in a manner which avoids an excessive transitory drop in the supply voltage from the battery (42). Such a transitory drop may inhibit the powering-up operation and also may cause the battery to be exchanged prematurely because it appears that the battery is no longer usable. The phased activation of the function may be effected in a pre-planned phase sequence or by using a control loop monitoring the supply voltage.

17 Claims, 4 Drawing Sheets

METHOD OF POWERING-UP BATTERY POWERED APPARATUS

Figure 1:
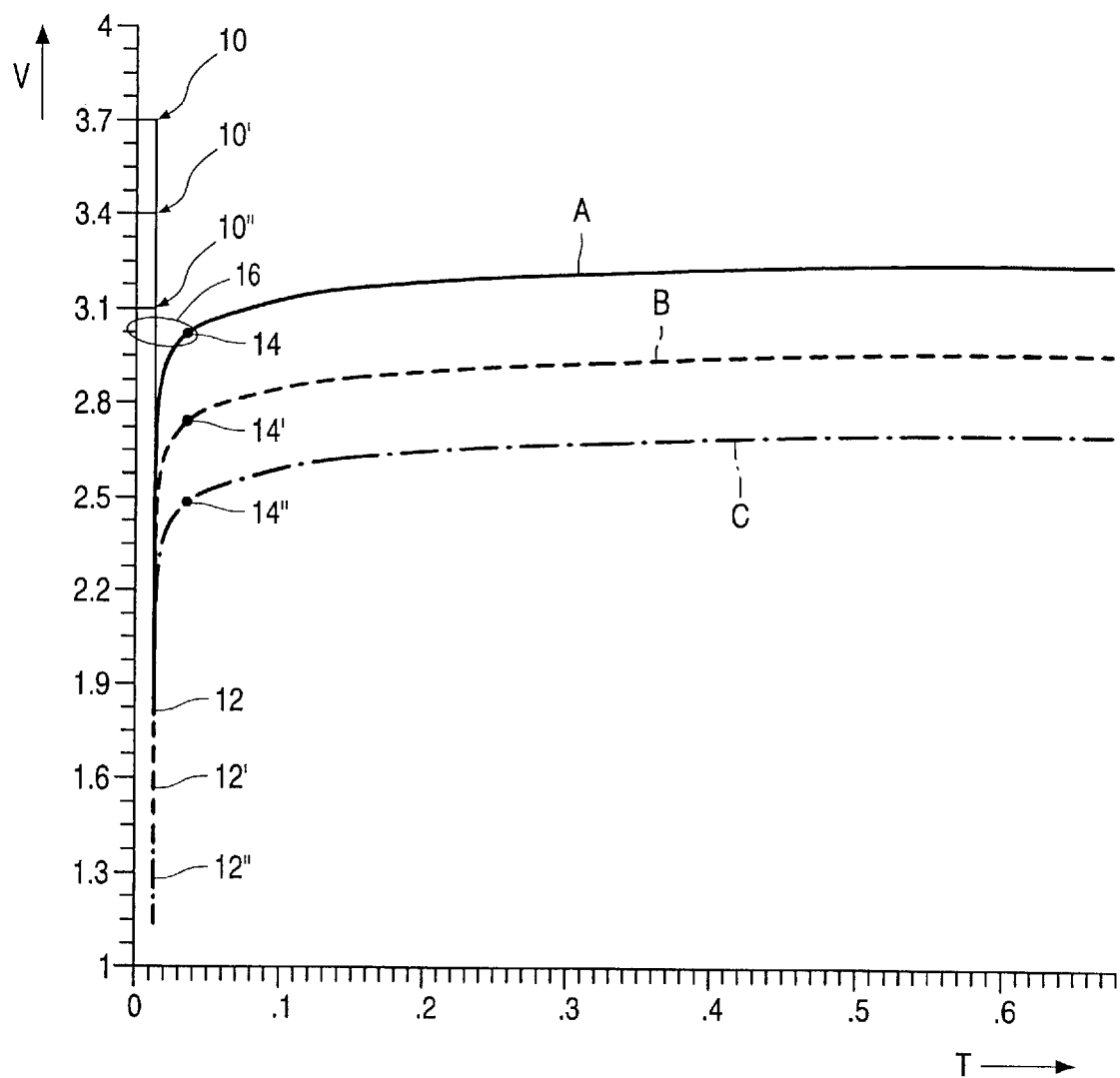

The present invention relates to a method of powering-up battery powered apparatus which includes means for interrupting the powering-up process should the supply voltage drop below a critical level. Such apparatus includes battery powered radio units, lap-top computers, camcorders and CD players.

When switching-on battery powered apparatus the effect of instantly applying a load to the battery is a sharp drop in the supply voltage. If the apparatus includes supply voltage monitoring means then this sharp drop in the supply voltage may interrupt the switch-on process but as the supply voltage rises the switch-on cycle restarts causing the supply voltage to drop again. This cycle of switching-on, -off and -on again is known in the art as "motor boating". In order to avoid motor boating, power supply circuits of the apparatus frequency include a high value capacitor to maintain the supply voltage. Since a high value capacitor is physically large, it is desired to avoid using such a solution when making smaller apparatus in which space is a premium.

An object of the present invention is to power-up reliably battery powered apparatus.

According to a first aspect of the present invention there is provided a method of powering-up a battery powered equipment by a phased activation of a function to increase the current consumption which avoids an excessive transitory drop in the supply voltage from the battery (or supply source).

According to a second aspect of the present invention there is provided a battery powered equipment having means for effecting the phased activation of a function to increase current consumption in a manner which avoids an excessive transitory drop in the supply voltage from the battery (or supply source).

The present invention is based on the realisation that newer batteries, such as lithium-iron high capacity batteries, exhibit a transitory voltage drop when substantial currents are drawn from them. The transitory voltage drop, which may last for less than 10 ms, can be sufficient to cause problems for circuit devices, such as a microcontroller, in which operation outside their specification may lead to loss of values being stored in a memory or even to a reset of the device. By avoiding the production of an excessive transitory drop in the battery supply voltage these problems can be mitigated without requiring a high value capacitor.

The current consumption may be increased in stages by activating circuit stages in succession. The activation of each stage is effected after the battery voltage has recovered, this being done by for example monitoring the battery terminal voltage and switching-on the next following stage once the voltage has recovered or modelling the battery voltage supply curve and estimating the time interval between adding an increment of load and the voltage supply curve recovering and in operation waiting at least the estimated time interval before making another incremental increase in the load.

In the case of needing to power-up reliably a high current consuming load use can be made of at least one dummy load which consumes say about half the current of a real load. In operation, in a first powering-up phase the dummy load is connected to the battery and once the battery has recovered then in a second phase (or subsequent phase if more than one dummy load has to be used) the real load is connected to the battery, whilst the dummy load(s) is (or are) disconnected, enabling a high current to be supplied whilst avoiding the risk of incurring an excessive transitory voltage drop.

Although the time spent drawing partial load currents wastes some energy, an advantage of avoiding significant voltage drops is that the battery can be operated longer as it will decay steadily until it reaches its end point. Thus the total battery lifetime is increased which is of significance in battery powered telemetry apparatus, for example automatic meter reading apparatus, in which the operation of exchanging of batteries has a high relative cost.

Figure 2:
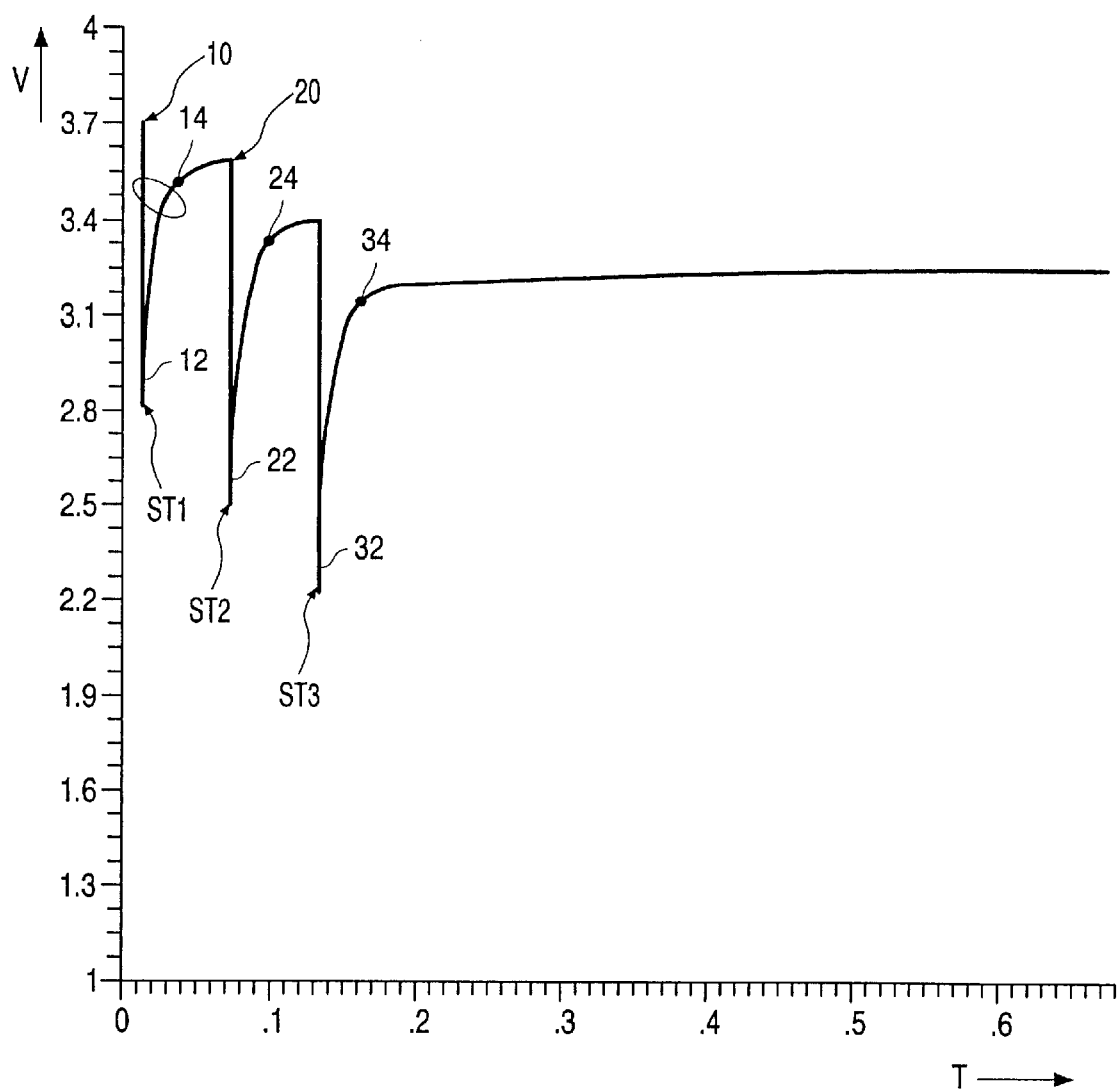
Figure 3:
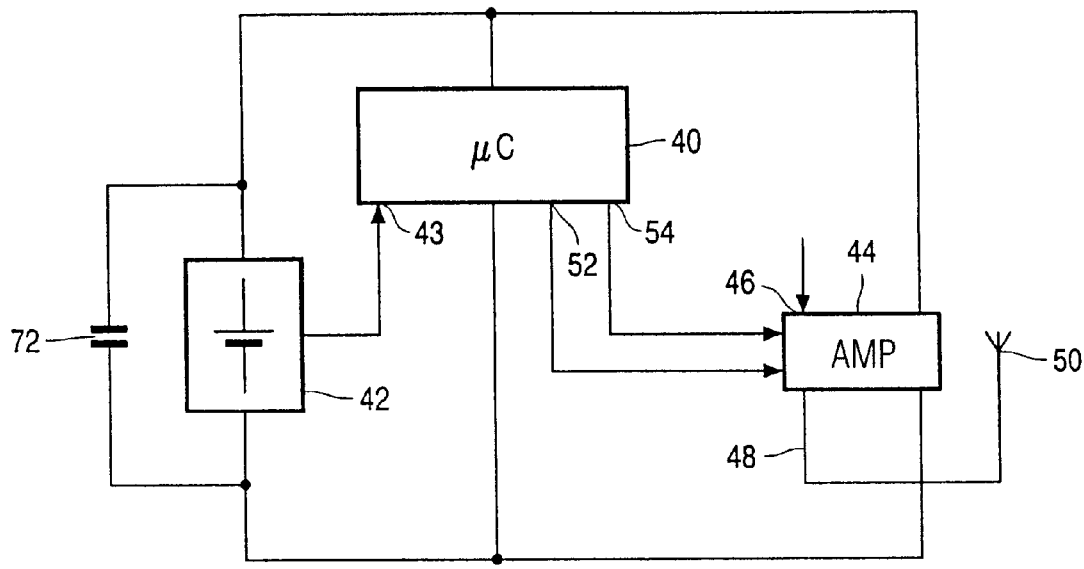
Figure 4:
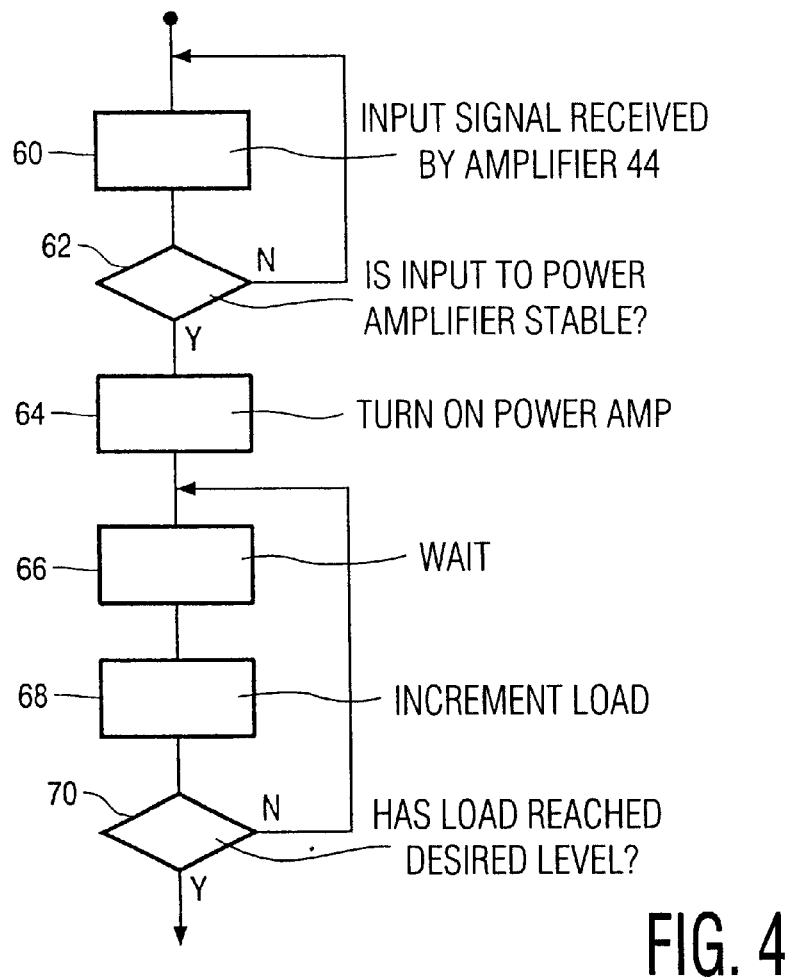

The present invention will now be described, by way of example, with reference to the accompanying drawings, wherein:

FIG. 1 are graphs of elapsed time (T) in seconds versus the supply voltage in volts (V) of a lithium-iron battery when a large load is added in a single operation, FIG. 2 is a graph of elapsed time (T) in second versus the supply voltage in volts (V) of a lithium-iron battery when there is a phased activation of a load, FIG. 3 is a general block schematic diagram of an apparatus including a power amplifier, and FIG. 4 is a flow-chart illustrating one embodiment of the method in accordance with the present invention.

Figure 5:
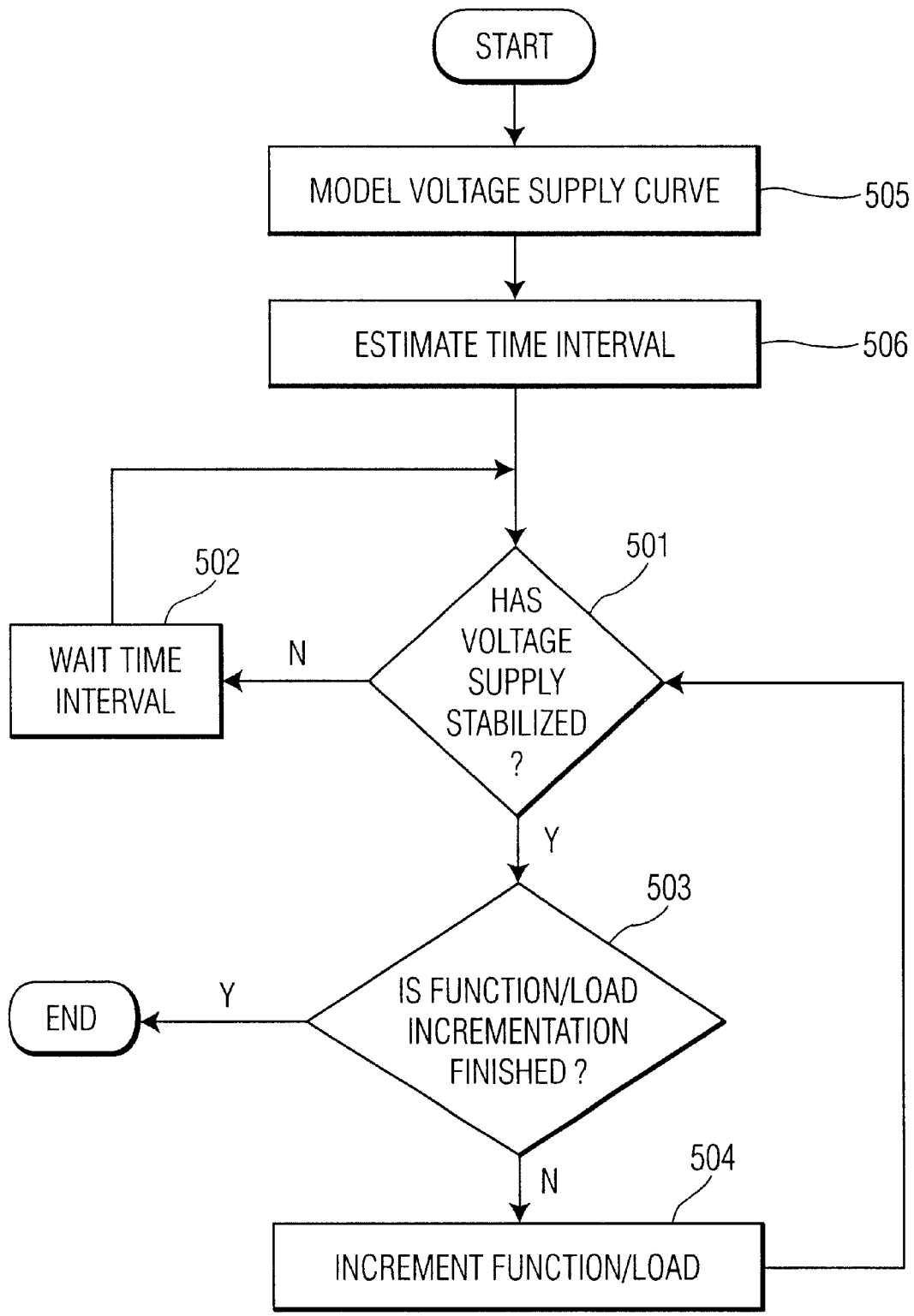

FIG. 5 is a flow-chart illustrating another embodiment of a method in accordance with the present invention.

In the drawings the same reference numerals have been used to identify corresponding features.

Referring to curve A in FIG. 1, prior to switch-on, reference point 10, the battery has a terminal voltage of 3.7 volts. As the circuit is powered-up the battery voltage drops substantially instantaneously to about 1.8 volts, reference point 12, and then recovers to substantially 3.0 volts, reference point 14, about 20 ms later. The duration of the recovery, particularly in the encircled area 16, is critical because a device such as a microcontroller may treat the low voltage spike as being a premature low charge condition of the battery and reset thereby inhibiting further energisation of the apparatus. In some cases the microcontroller will reset if the power supply drops below a threshold value for less than 0.1 µs. The situation deteriorates as the battery life decays as is indicated by the two broken line curves B and C in which the corresponding points have been referenced 10'. 12'. 14' and 10", 12", 14", respectively. There is a strong likelihood that the battery will have to be replaced sooner than is actually necessary.

As mentioned in the preamble, it is known to use a high value capacitor to dampen the effect of the sudden voltage drop but there are some disadvantages to using such a capacitor.

FIG. 2 illustrates the effect of the phased activation of a load using the method in accordance with the present invention. At switch-on, reference point 10, only a portion of the load is coupled to the battery, stage ST1. Initially the voltage drops rapidly, reference point 12, and then recovers to a reference point 14. In a second stage ST2, a second portion of the load is added and the supply voltage drops rapidly from a point 20 to a point 22 and recovers to reference point 24. In a third and final stage ST3, a final portion of the load is added and the supply voltage drops rapidly from a point 30 to a point 32 and recovers to a point 34 which lies on the normal discharge characteristic of the battery.

Comparing the graphs of FIGS. 1 and 2, it is evident that in FIG. 2 the durations that the voltage spikes are below say 2.5 volts are very brief. As the battery decays, the phased activation of the load ensures that the battery can be used for a longer time before it has to be replaced because its terminal voltage can be lower before the critical duration of a low voltage glitch causes the microcontroller to assume that the battery is in a low voltage condition and should be recharged/replaced.

FIG. 3 illustrates a microcontroller 40 coupled to a battery 42 and to a load in the form of a power amplifier 44. The microcontroller 40 has an input 43 for measuring the terminal voltage of the battery 42. The power amplifier 44 has an input 46 for receiving a modulated carrier as an input signal and an output 48 for connection to a signal propagation device such as an antenna 50.

The microcontroller 40 provides a power amplifier on/off signal on a terminal 52 in response to actuation of a man/machine interface (not shown) or a software generated control signal. On another terminal 54, the microcontroller 40 provides gain setting input signals which provide a phased activation of the load, that is, the amplifier gain is increased in stages, and the current drain from the battery increases causing its terminal voltage to drop.

The phased activation of the load by the microcontroller 40 can be effected in a number of ways. The flow chart shown in FIG. 4 can be used to illustrate two ways of phased activation of the load as represented by the gain setting. Block 60 indicates an input signal being applied to the input of the power amplifier 44 (FIG. 3). In block 62 a check is made to see if the input signal to the power amplifier 44 is stable. If it is not stable (N), the flow chart reverts to the block 60. If it is stable (Y), then in block 64 the power amplifier 44 is turned-on with its gain set to a minimum. In block 66 a waiting period is inserted into the control process. The duration of the waiting period may be predetermined or variable depending on the control method being used. In the case of the waiting period being predetermined, the discharge characteristic of the battery 42 is modelled and the time for recovery from the addition of an increment of the load, that is, the gain in the presently described example, is determined and this is treated as a fixed waiting period. In the case of the period being variable, control loop monitoring may be used in which the microcontroller 40 monitors the battery voltage and as it recovers to a predetermined level, it causes the load to be incremented. Block 68 denotes the incrementing of the load following the expiry of the waiting period. In block 70, a check is made that the load has reached its desired level. If it has (Y) then the process is ended and the circuit operates normally. If the load has not reached its desired level (N), the flow chart reverts to the block 66.

In implementing the circuit a small value capacitor 72 (FIG. 3) may be coupled to the battery in order to reduce the size of, or eliminate, the spike, that is, the sharp drop to points 12, 22 and 32 in FIG. 2.

Depending on the application of the circuit, the increments of the load added may not be equal so that the waiting period may not be equal. This can be achieved by the load being increased in accordance with a pre-planned phase sequence in which the waiting period is related to the size of a particular increment.

In the case of a high current consuming load a phased powering-up can be effected by using one or more dummy loads, each dummy load drawing a fraction of the final current, for example half the current when using a single dummy load. Assuming a single dummy load, in a first phase the dummy load is connected to the battery and when the battery has recovered then in a second phase the real load is connected to the battery and the dummy load is disconnected enabling the full current to be supplied without an excessive transitory voltage drop.

FIG. 5 shows a flowchart of another embodiment of a method in accordance with the present invention. At 505, the voltage supply curve in accordance with FIGS. 1 and 2 is modeled. At 506, an estimate is made of a predicted a time interval between adding an increment of a function and the voltage supply curve recovering, based on the model. Box 501 is analogous to box 62 in FIG. 4. If the voltage supply has stabilized, control passes to box 503. If the voltage supply has not stabilized the time interval estimated in 506 is implemented in creating a delay at 502. Then control returns to box 501. Box 503 is analogous to box 70 in FIG. 4. Box 504 is analogous to box 68 in FIG. 4.

What is claimed is:

1. A method of powering-up a battery powered equipment by a phased activation of a function to increase the current consumption which avoids an excessive transitory drop in the supply voltage from the battery (or supply source).

2. A method as claimed in claim 1, characterised by increasing the function in stages in order to ensure that the supply voltage remains equal to or above a predetermined level.

3. A method as claimed in claim 1, characterized by monitoring the supply voltage after an incremental increase in the function and when the supply voltage has recovered, increasing the function by another increment.

4. A method as claimed in claim 1, characterized by modeling the battery supply curve and estimating a time interval between adding an increment of the function and the voltage supply curve recovering and in operation waking at least the said time interval before making another incremental increase in the function.

5. A method as claimed in claim 1, characterised by increasing the function in a pre-planned phase sequence.

6. A method as claimed in claim 1, characterised by increasing the function using a control loop monitoring the supply voltage.

7. A battery powered equipment having means for effecting the phased activation of a function to increase current consumption in a manner which avoids an excessive transitory drop in the supply voltage from the battery (or supply source).

8. The equipment as claimed in claim 7, characterized by a control loop for monitoring the supply voltage and means responsive to a recovery from a supply voltage drop for effecting a phased activation of the function.

9. The equipment as claimed in claim 7, characterized by means for increasing the function in a pre-planned sequence.

10. A method for activating electrical equipment comprising receiving electricity from a battery;

first initiating a first activation stage of the equipment;

monitoring a voltage level from the battery, responsive to the initiating, until the voltage level is stable; and second initiating a second activation stage of the equipment.

11. The method of claim 10, wherein the battery produces a voltage which drops precipitously and rises again during a time interval after the first activation stage; and the second initiating occurs after the time interval, so that the equipment avoids erroneously detecting battery failure during the precipitous drop.

12. Electrical equipment comprising means for receiving electricity from a battery;

means for monitoring a voltage level from the battery;

first initiating a first activation stage of the equipment;

second initiating a second activation stage of the equipment, responsive to the monitoring detecting a stabilization of the voltage level of the battery after the first initiating.

13. The equipment of claim 12, wherein the battery produces a voltage which drops precipitously and rises again during a transitory period alter the first activation stage; and the second initiating occurs after the transitory period, so that the equipment avoids erroneously detecting battery failure during the precipitous drop.

14. The equipment of claim 7, wherein the control loop monitors the supply voltage after an incremental increase in the function and, when the supply voltage has recovered, allows the function to increase by another increment.

15. The method of claim 1, comprising, in operation, waiting at least an estimated time interval between first and second incremental increases in the activation of the function, the estimated time interval being based on a model of a battery voltage supply curve and taken between the first incremental increase of the function, and the model's prediction of when the voltage supply curve will recover after the first incremental increase.

16. The equipment of claim 7, comprising at least one processor for performing at least the following operations:

modeling a battery voltage supply curve of the battery;

estimating the time interval between adding an increment of the function and the voltage supply curve recovering; and in operation, waiting at least the said time interval before making another incremental increase in function.

17. The equipment of claim 7 comprising means for waiting, in operation, for at least an estimated time interval between a first and second incremental increase in the function, the estimated time interval being based on a model of a battery voltage supply curve and taken between the first incremental increase of the function, and the model's prediction of when the voltage supply curve will recover after the first incremental increase.

* * * * *